April 28, 1931.  J. A. KUBIS  1,803,261
SANITARY COVER RING FOR MEAT GRINDERS
Filed Oct. 9, 1929
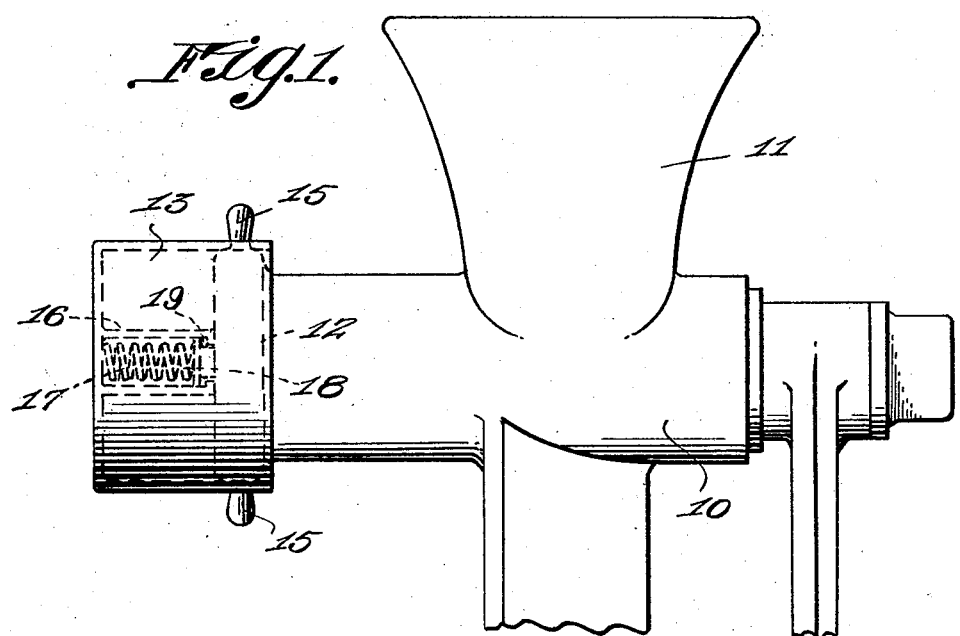
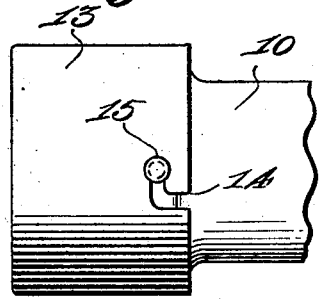
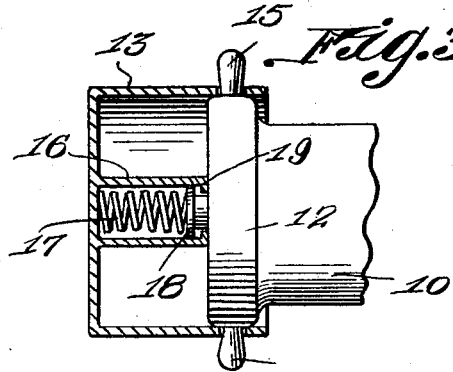
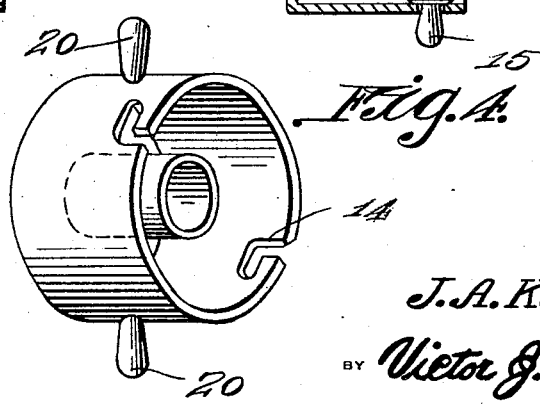
J. A. Kubis, INVENTOR
BY Victor J. Evans ATTORNEY Patented Apr. 28, 1931

1,803,261

UNITED STATES PATENT OFFICE

JOSEPH A. KUBIS, OF BROWNSVILLE, PENNSYLVANIA

SANITARY COVER RING FOR MEAT GRINDERS

Application filed October 9, 1929. Serial No. 398,476.

This invention has for its principal object the rendering of the discharge ends of meat grinders and the like free from exposure to and contamination with parasites and inert matter while the grinder is not in use.

An object of the invention primarily resides in the provision and arrangement of a covering for this purpose.

An additional object of the invention embodies a guide member for the covering whereby the latter may be effectively removed and replaced.

More specifically stated the covering and grinder are provided with a means of fastening whereby the covering may not become accidentally displaced.

With the above and other objects in view, the invention further consists of the following novel features and details of construction to be hereinafter more fully described, illustrated in the accompanying drawing and pointed out in the appended claims.

In the drawing:—

Figure 1 is a fragmentary side elevation of a well known type of meat grinder and illustrating by dotted lines the relationship of the form of covering therewith.

Figure 2 is a fragmentary top plan view of the meat grinder and covering.

Figure 3 is a sectional view taken through the covering as applied.

Figure 4 is a perspective view of a modified form of my invention.

Referring to the drawing in detail wherein like characters of reference denote corresponding parts, the reference character 10 indicates generally a conventional form of meat grinder having a hopper 11 and a ring or collar 12 suitably arranged upon the discharge end of the grinder casing to maintain a desired form of strainer plate in position.

As generally known to butchers and other persons familiar with the use of meat grinders, some of the meat is always choking the passageways or openings in the form of strainer plate employed. Flies and inert matter, having access to the meat, necessarily render same impure and the next succeeding customer desiring ground-up meat, such as hamburger, buys the contaminated meat because of its being exposed. It is my intention to overcome this objection by providing a form of covering to entirely shield the collar or ring and the exposed portion of the strainer plate and meat adhering thereto.

In carrying out my invention, I provide a covering in the form of a cup-shaped member 13, preferably arranged in the manner shown in Figures 1, 2, 3 of the drawing and which has provided a pair of bayonet slots 14 upon diametrically opposite sides of the periphery therefor to accommodate the handles or studs 15 projecting in oppositely disposed relation upon the outer circumference of the ring or collar 12.

As mentioned in the foregoing, the form of covering or protector is provided with a guide member to facilitate ease in the application and removal thereof and to this end I employ a sleeve member 16 centrally disposed within the confines of the cup-shaped covering 13 and carried upon the closed end thereof. A compression spring 17, arranged within the bore of the sleeve 16 and having one end convolution sprung against the adjacent portion of the closed end wall of the covering or protector is sprung at its opposite end against a disk member 18 horizontally disposed and slidably mounted within said sleeve.

Lugs or ears, such as indicated at 19, inwardly projected from the free end of the sleeve 16, engage the outer surface of the disk 18 to prevent accidental displacement of the latter when the covering or protector is removed. The disk 18 is employed for the purpose of engaging an adjacent protruding extremity of the axle or shaft for the worm feed mechanism of the grinder. The aforementioned extremity of the axle or shaft engaging the disk 18 and compressing the spring 16 will coact with the studs 15 and bayonet slots 14 in the retention of the covering. A slight twist or partial rotation is all that is required to remove or replace the form of covering.

It may be necessary in the larger commercial types of grinders to employ more suitable means for removing the substantially enlarged covers and for this reason the Figure 4 modification is suggested having for its object the arrangement of handle members 20, constructed after the manner of the studs 15 whereby greater stress may be exercised upon the covering to twist same against the tension of the stronger spring.

The invention is susceptible of various changes in its form, proportions and minor details of construction and the right is herein reserved to make such changes as properly fall within the scope of the appended claims.

Having thus described the invention, what is claimed is:—

1. An attachment for meat grinders comprising a cup-shaped body arranged for telescopic association with the discharge end of the grinder, a guide sleeve arranged upon the bottom of the body and accommodating the extremity of the grinder feed worm shaft therein, a compression spring arranged within the bore of the sleeve, a disk disposed within the confines of the sleeve and interposed between the spring and feed worm shaft to exercise the desired tension against the latter, and a bayonet slot connection between the telescoped portions of the grinder and body cooperating with the feed worm shaft and spring connection.

2. An attachment for meat grinders comprising a cup-shaped body arranged for telescopic association with the discharge end of the grinder, a guide sleeve arranged upon the bottom of the body and accommodating the extremity of the grinder feed worm shaft therein, a compression spring arranged within the bore of the sleeve, a disk disposed within the confines of the sleeve and interposed between the spring and feed worm shaft to exercise the desired tension against the latter, a bayonet slot connection between the telescopic portions of the grinder and body cooperating with the feed worm shaft and spring connection, and lugs arranged upon the sleeve to retain the disk therein.

In testimony whereof I affix my signature.

JOSEPH A. KUBIS.